Oct. 27, 1953  W. H. PAYNE  2,657,327
ADJUSTING SYSTEM FOR FURNACE CONTROLS
Filed May 8, 1951  3 Sheets-Sheet 1

Inventor
William Harvey Payne
By Fred Gerlach atty.

Patented Oct. 27, 1953

2,657,327

UNITED STATES PATENT OFFICE 2,657,327

ADJUSTING SYSTEM FOR FURNACE CONTROLS

William Harvey Payne, Hinsdale, Ill.

Application May 8, 1951, Serial No. 225,239

17 Claims. (Cl. 314—61)

The present invention relates in general to the precise adjustment of movable structures, and has more particular reference to the control of power translation equipment employed for adjusting the movable electrodes of an electric arc melting furnace.

The invention particularly relates to the operation and precise control of hydraulic power translation apparatus of the sort adapted for obtaining accurate control of an adjustable member or structure, the invention pertaining especially to equipment for the control of adjustable electric arc furnace electrodes, which require maximum adjusting precision. In its broader aspects, however, the invention is not necessarily limited to equipment for electrode adjustment, but may be applied wherever precision is desirable in the adjustment of a movable part or structure, especially where heavy or ponderous structures are involved.

In adjusting mechanism for the electrodes of an electric arc melting furnace, of which there are usually three, each electrode is separately supported on a movable mounting which, in turn, is drivingly connected with suitable power translation equipment adapted to adjustably move the mounting and the electrode carried thereby.

It should be understood that electrodes of the character mentioned not only require axial adjustment thereof, to maintain the arcing tip of the electrode in properly spaced relationship with respect to the material being melted as the arcing tip is burned away, in order to maintain a melting arc between the electrode tip and the charge of material being melted, but the electrode, at all times during the melting operation, should also be supported in such position of spacement, between electrode tip and the charge, as to provide an arc of optimum melting characteristics. This requires continual adjustment of the electrode and its support in accordance with the electrical power, usually measured in terms of current and potential, applied to form and maintain the arc, there being, at all times during the operation of the furnace, a critical spacement or arc path between the electrode tip and the charge being melted that will produce an arc of optimum melting character, at the electrical current and potential supplied for the establishment and maintenance of the arc.

In order to maintain such optimum arc conditions it is of course necessary, continuously during the operation of the furnace, to adjustably move each electrode and its mounting toward the position providing optimum arcing conditions, whenever the electrode is displaced from such position. In order to obtain such electrode adjustment within the shortest possible interval of time without, however, overrunning or passing beyond the required position of adjustment, it is desirable to adjustingly move the electrode initially at a rate of speed proportional to electrode displacement from the required adjusted position, said rate of adjusting speed desirably being progressively reduced to zero as the required position of adjustment is reached.

In this connection, it should be understood that speed reduction at a desired rate is necessary only within a limited deceleration zone determined by the maximum rate of adjusting movement of the structure, and its inertia, said zone representing the distance within which the structure moving at maximum speed may be brought smoothly to standstill condition at a desired position of adjustment. In moving the structure from a position outwardly of the deceleration zone toward the required position of adjustment, it is not necessary to reduce adjusting speed until the zone limit is reached. When moving outwardly of the zone, the structure may be moved at maximum speed.

The electrodes and their mountings, especially in large structures, have appreciable mass which continuously changes as the tips of the electrodes become progressively burned off during their useful life. The inertia of an electrode and its mounting likewise changes during the life of the electrode due to such progressive reduction in electrode mass. Where the adjustable structure is moved initially rapidly and thereafter progressively more slowly as the required position of adjustment is approached, inertia effects, which are a function of speed of movement, also change during the electrode adjusting operation. Frictional effects likewise vary during the adjusting operation. Such constantly varying conditions of operation make it difficult to obtain accuracy and precision in the adjustment of the electrode structure, especially within the deceleration zone, such difficulties particularly affecting the operation of electrode adjusting mechanism, although present to a greater or lesser degree in any mechanism for the speedy and precise adjustment of relatively ponderous structures.

An exceedingly troublesome operational difficulty encountered in apparatus of the character mentioned is the tendency of the adjusting equipment to "hunt," or travel back and forth at the required position of adjustment. The adjusting equipment, when required to do so, may move the structure to be adjusted toward the required position of adjustment, but due to variations in inertia and other variable operational conditions, not only in the adjusting equipment itself but also in the structure to be adjusted, especially where ponderous equipment is involved, the movable structure being adjusted may be carried beyond the position of exact required adjustment. Thereupon, reversal of the adjusting means may return the movable structure through and beyond the required position of adjustment, such repeated reversing of the adjusting means, in its effort to reach an exact position of required adjustment, being termed "hunting." This undesirable effect is intensified in equipment in which mass, inertia, friction and speed are variables from time to time or at all times during the operation of the equipment.

Various more or less elaborate expedients have heretofore been proposed in an effort to reduce hunting and other operational difficulties which arise through one or more of the foregoing variable conditions encountered in the operation of apparatus of the character mentioned.

Systems heretofore provided for positioning the relatively heavy electrode mounting structure and associated parts have required large, powerful and heavy motors; and the consequently large over-all inertia of the parts to be moved, including the inertia of such driving motors, increases the difficulty of bringing the mechanism accurately and rapidly to a desired position of adjustment. Furthermore, the necessity of employing large and powerful adjusting motors, together with elaborate anti-hunt and control equipment, very appreciably increases the cost of the equipment and the installation thereof.

Although the invention will hereinafter be described more particularly with respect to its application to the adjustment of arc melting furnace electrodes, it will be apparent that the system may be applied to other purposes and consequently is not necessarily limited to the control of arc melting furnace electrodes.

An important object of the present invention is to provide new and improved precision adjusting equipment for the rapid adjustment of relatively ponderous structures and particularly the electrode structures in electric arc melting furnaces; a further object being to provide simple and relatively inexpensive control mechanism adapted for installation at relatively low cost which will afford exceedingly precise and rapid control of adjustable equipment substantially without hunting difficulties, equipment embodying the present invention being essentially of simple yet rugged construction adapted to give substantially trouble-free service throughout an extended service life.

Another important object is to provide improved adjusting means of the character mentioned, especially well suited for the adjustment of electrodes in an electric arc melting furnace, wherein the adjusting action is influenced or controlled and accomplished in accordance with variations in operating conditions prevailing during the adjusting operation and including variable adjusting speed, mass, inertia, friction, and the like.

Another important object is to provide improved adjusting means wherein adjustment is accomplished at an initial rate of speed which varies with the degree of displacement of the structure being adjusted from a required position of adjustment, said rate of adjusting speed being progressively decreased as the structure approaches the required position of adjustment; a further object being to provide control of the adjusting means in accordance with variations in operating conditions prevailing during the adjusting operation and including variable adjusting speed, mass, inertia, friction, and the like.

Another important object is to provide fluid pressure adjusting means wherein adjusting movement of an adjustable structure is accomplished in accordance with pressure of fluid applied in the system for adjusting purposes, including controllable means for regulating fluid pressure in accordance with variations in operating conditions prevailing during the adjusting operation and including variable adjusting speed, mass, inertia, friction, and the like.

Another important object is to provide fluid pressure adjusting means wherein adjusting movement of an adjustable structure is accomplished in accordance with pressure of fluid applied in the system for adjusting purposes, including controllable means for regulating fluid pressure in accordance with the displacement of the structure from a required position of adjustment, and wherein fluid adjusting pressure is also regulated in accordance with variations in operating conditions prevailing during the adjusting operation and including variable adjusting speed, mass, inertia, friction, and the like.

Another important object is to provide an hydraulic system for the adjustment of a movable structure, such as the electrode structure of an electric arc melting furnace, including means for applying an hydraulic fluid to the adjustment of the structure at an initial rate corresponding with the displacement of the structure from a required position of adjustment and a progressively decreasing adjusting rate as the structure approaches such required adjusted position, including control means for modifying the application of the adjusting fluid to the structure, in accordance with variations in operating conditions prevailing during the adjusting operation and including variable adjusting speed, mass, inertia, friction, and the like.

Another important object is to provide in an hydraulic control system a control valve adjustable in one direction to control a fluid flow port in accordance with one adjustment determining variable, and adjustable in another direction to control the valve port in accordance with another or operation variable or variables.

Another important object is to provide an hydraulic control system including a control valve angularly turnable to control a fluid port of the valve and axially adjustable to control said port.

Another important object is to provide a system for adjusting a movable structure, such as the electrode structure of an electric arc melting furnace, including simple means for disabling the adjusting equipment when the adjustable structure "bottoms," or meets with an obstruction during the adjusting operation; a further object being to provide disabling means, operable to disable electrode adjusting equipment, in an arc melting furnace, whenever the electrode comes to rest upon and in physical contact with the charge to be melted, such "bottoming" being apt to occur short of the range of movement, in one direction, of the adjustable structure, that is to say, within the normal operating range of the adjusting means.

The foregoing and numerous other important objects, advantages, and inherent functions of the invention will become apparent as the same is more fully understood from the following description, which, taken in connection with the accompanying drawings, discloses a preferred embodiment of the invention.

Referring to the drawings.

To illustrate the invention the drawings show adjusting mechanism particularly well suited for the adjustment of the electrodes of an electric arc melting furnace, although it will be apparent that the invention is not necessarily limited to the particular structure to be adjusted. The electric arc melting furnace may comprise a container 11 for a charge of material to be melted, said container being provided with a roof 12 having an opening or openings for the reception of furnace electrodes, of which one electrode 13 is shown. Ordinarily several electrodes, usually three, are employed, each having its separate supporting and adjusting equipment, but since the supporting and adjusting apparatus is duplicated for each electrode, it will be sufficient to describe but one electrode and its associated equipment.

The furnace structure, on one side, may carry a support bracket 14 provided with rollers 15 forming a guide for a frame 16 having horizontally disposed electrode supporting arm 17 at the top of the frame and extending in position overlying the electrode opening in the roof 12 of the furnace, the electrode 13 being secured and supported on the arm 17 in position extending into the furnace through the opening. The arm 17 also is preferably insulated from the frame 16 and may carry suitable electrical power supply conductor means 18 electrically connecting the electrode 13 with a suitable electrical power source.

The frame 16 and arm 17 thus provide a mounting structure for the electrode 13, said mounting being vertically movable between the guide rollers 15. By moving the structure the electrode may be raised and lowered to adjust the same within the furnace.

The furnace and electrode may, of course, be of any standard or conventional form, lined with refractory material and adapted to contain a charge of metal or other electrical conducting material to be melted. Electrical power may be supplied to the furnace electrode from a suitable power source, such as a transformer winding, one side of which may be connected to the electrode as by means of the conductor means 18 and a flexible conductor 19 connected therewith. The other side of the transformer may be grounded and thus connected with the furnace structure, which is also preferably grounded.

In starting a furnace in operation, power is supplied to the electrodes and the same are lowered to arcing position with their tips closely spaced with respect to the charge material in the furnace. When in arcing position electric current will flow through the electrodes and the material of the charge, thus causing arcs to be formed between the electrodes and the charge, the heat developed by the arcs serving to melt the charge. As soon as the arcs are formed it is desirable immediately to adjust the arcing tips with respect to the charge material to positions of adjustment, such as will provide arcs of optimum melting character and thereafter to maintain the adjusted position of each electrode, during the changes in shape of the arc facing surface of the charge material during the melting thereof, in order to maintain optimum arcing conditions throughout the melting operation. In this connection, the charge initially and also during the melting operation may have an uneven electrode facing surface shape, which may progressively become altered as the melting process takes place, thereby requiring the several electrodes to be independently and continuously adjusted for the maintenance of optimum arcing conditions, it being also necessary to adjust each electrode independently of the others as it becomes burned off at its arcing tip.

In order to accomplish the continuous adjustment of the electrodes in the furnace, during arcing, the present invention provides separate adjusting means 20 for each electrode and its adjustable supporting structure. To this end, the adjusting means 20 may comprise a preferably hydraulic fluid pressure system comprising a piston 21 and a cooperating cylinder 22 interconnected between the movable electrode supporting frame and the furnace structure. As shown, the piston 21 is mounted on and secured to the adjustable electrode supporting structure, which thus is supported on the upper end of the piston. The lower end of the cylinder 22 is seated upon and supported by a suitable bracket 23 mounted on the furnace structure. The lower end of the cylinder 22 extends below the piston 21 and may be connected to a conduit or pipe 24, as by means of a preferably flexible hose 25, through which a suitable liquid hydraulic fluid may enter or be withdrawn from the cylinder 22 in order to move the piston therein and thus raise or lower the electrode 13 in the furnace in accordance with pressure changes of the fluid in the conduit 24.

In such an arrangement, the piston will be moved in the cylinder and, hence, raise or lower the electrode carrying structure in response to the delivery and withdrawal of regulated quantities of the hydraulic medium to and from the cylinder. In order to obtain accuracy in the adjustment of the movable structure, the hydraulic medium is delivered to and from the cylinder by suitable pumping and flow control means 26 embodying the present invention and operated in accordance with the desired adjustment to be accomplished, such adjustment primarily being a function of variations in the electrical power delivered through the conductor 19 to the electrode, the same reflecting optimum arcing conditions in the furnace and the degree that the electrode is at any time displaced from a position affording optimum arcing conditions. In accordance with the teachings of the present invention, the flow control means 26 provides for the adjustment of the system in order to vary the delivery of the fluid pressure medium in accordance with variations in the rate of adjustment, the mass of the adjusted structure, the changes in inertia and friction of the parts during adjustment.

To these ends the hydraulic medium is supplied in the system under pressure in any suitable fashion as by means of a fluid pump 27 drivingly connected with a suitable motor. The suction side of the pump is connected through an inlet pipe 28 with any suitable source of the fluid pressure medium employed in the system, said source as shown comprising a tank or reservoir 29 containing the medium which may conveniently comprise oil, the reservoir or tank 29, at its upper end being provided with an air vent 30. The discharge side of the pump 27 also is connected with the reservoir through a return conduit 31 containing a preferably spring-loaded valve 32 to determine the operating pressure of the system 26. Obviously, any suitable arrangement for providing the hydraulic medium at a desired pressure for the operation of the control system 26 may be employed.

Figure 1:
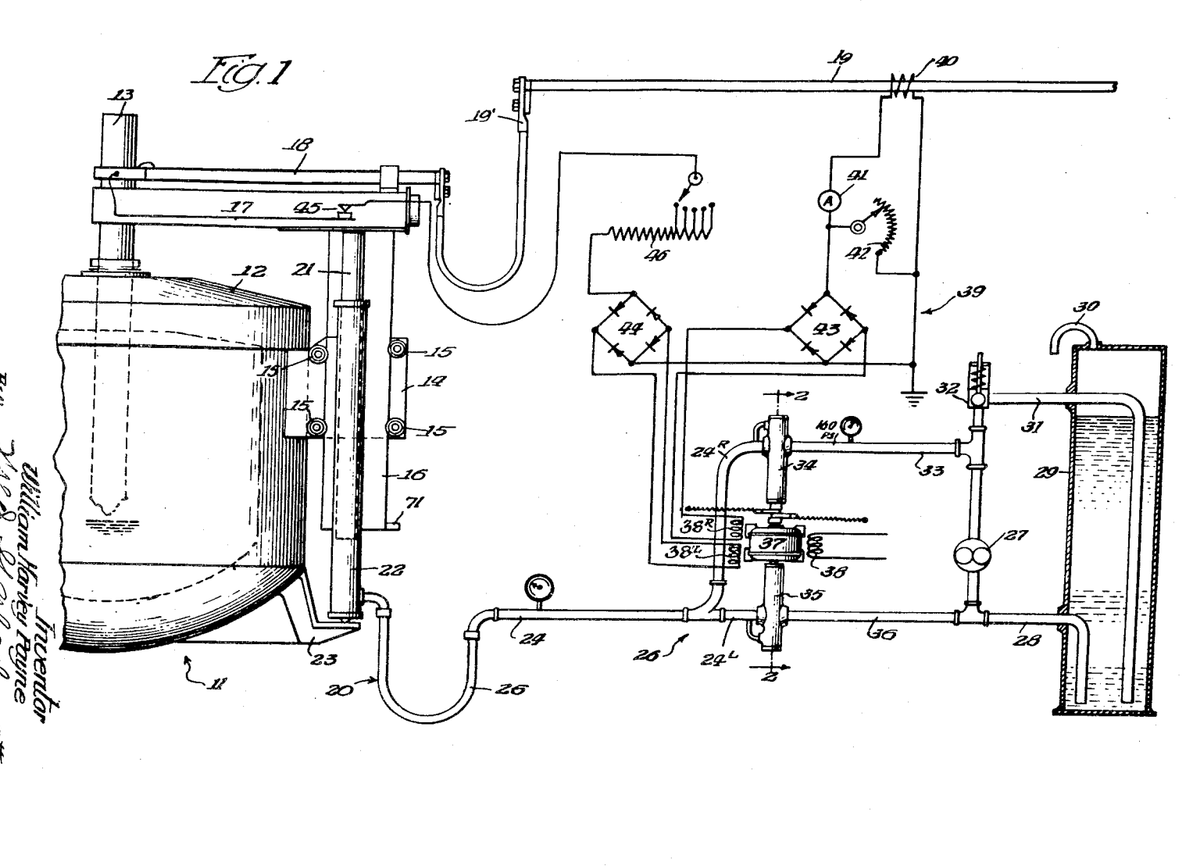
Fig. 1 is a schematic view of electrode adjusting equipment embodying the present invention, the view showing one phase only of a normally multi-phase electric arc melting furnace.

As shown more particularly in Fig. 1 of the drawings, the system 26 comprises a conduit 33 connected with the discharge side of the pump 27 and, hence, supplied with the hydraulic medium at the discharge pressure of the pump as determined by the spring-loaded valve 32. This conduit 33 is connected with the conduit 24 through a raising valve 34 so that the structure to be adjusted, namely the electrode and its support structure, may be adjusted in the raising direction by supplying the hydraulic medium through the valve 34.

The control system, as shown in Fig. 1, also includes a lowering valve 35 connected in a conduit 36 which is connected between the conduit 24 and the suction side of the pump 27. Accordingly, to lower the adjustable structure, the lowering valve 35 may be opened to permit the hydraulic medium to flow from the conduit 24 to the storage reservoir 29 under the influence of the weight of the adjustable structure applied through the piston 21 upon the hydraulic medium in the cylinder 22 below the piston.

Controlling operation of the raising and lowering valves 34 and 35 may be accomplished by means of a torque motor 37, or other suitable valve actuating means, such means being operated in accordance with the current and potential conditions prevailing in the power supply conductor 19.

The torque motor 37 preferably comprises a direct current motor having an armature winding 38 energized from a suitable power source at all times when the system is in operation, and a pair of field coils 38R and 38L wound and connected to exert opposing torque on the armature of the motor. Operating power is applied to the field coils 38R and 38L of the motor to drive it in one direction or the other as power conditions in the conductor 19 fluctuate above or below the desired arcing power condition to be maintained. To this end power is supplied from the conductor 19 through an electrical control system 39, comprising a current transformer 40, the secondary winding of which is inductively coupled with the supply conductor 19. This secondary winding may be connected in circuit with a current flow indicating ammeter 41, and an adjusting rheostat 42 to deliver energizing power to one of the field windings of the motor 37, preferably through a rectifier 43, one side of which is preferably grounded. The control system 39 may also include a rectifier 44, the sides of the input of which are connected, respectively, to ground and to the power supply conductor 19, or directly to the electrode 13, preferably though not necessarily through a bottoming switch 45 and an adjustable potentiometer 46.

The connection is preferably made, as shown, directly to the electrode 13, by means of a low impedance connecting conductor, in order to apply electrode potential, to the other of the field windings of the motor 37, with minimum modification due to the impedance characteristics of the supply line and the connecting conductor.

While rectifiers 43 and 44 are shown interconnected in the system to apply D. C. energy to the coils 38R and 38L, in proportion to electrode current and voltage conditions, it will be apparent that the field coils of the motor, if desired, may be energized by A. C. energy derived from the electrode power supply circuit, in which case the rectifiers may be omitted.

The rectifying networks 43 and 44, when used, are interconnected with the motor 37, in opposition, so that when the direct current output of the rectifier pair is equal, the net driving torque applied to the armature of the motor 37 will be zero and the motor consequently will be inactive to move in either direction. When, however, the direct current output of either of the rectifying networks exceeds the direct current output of the other, a driving torque corresponding with the differential output of the rectifiers will be applied to the armature of the motor 37 to drive the same in one direction or the other, depending upon which of the networks is delivering the greater current. The motor will thus be caused to move in one direction or the other in accordance with the difference in the direct current outputs of the rectifiers 43 and 44. The motor is drivingly connected with the control valves 34 and 35 and, hence, will operate the same in accordance with power conditions as to current and potential prevailing in the conductor 19, the same in turn being responsive to the character of the arc formed at the corresponding electrode in the furnace.

It should be noted that the motor will operate in a direction to lower the electrode in response to the application of electrical voltage on the electrode prior to the establishment of an arc at the electrode tip. Thus the electrode, in starting the furnace will be lowered toward arcing position, such movement being accomplished at maximum speed. As soon as the arc becomes established, however, the action of current flow in the arc will instantly operate, through the motor 37, to discontinue the lowering operation and, in fact, will cause retraction of the electrode to an optimum arcing position.

Figures 2, 3A, 3B, 3C, 4A, 4B, 4C, 5A, 5B, 5C, 6:
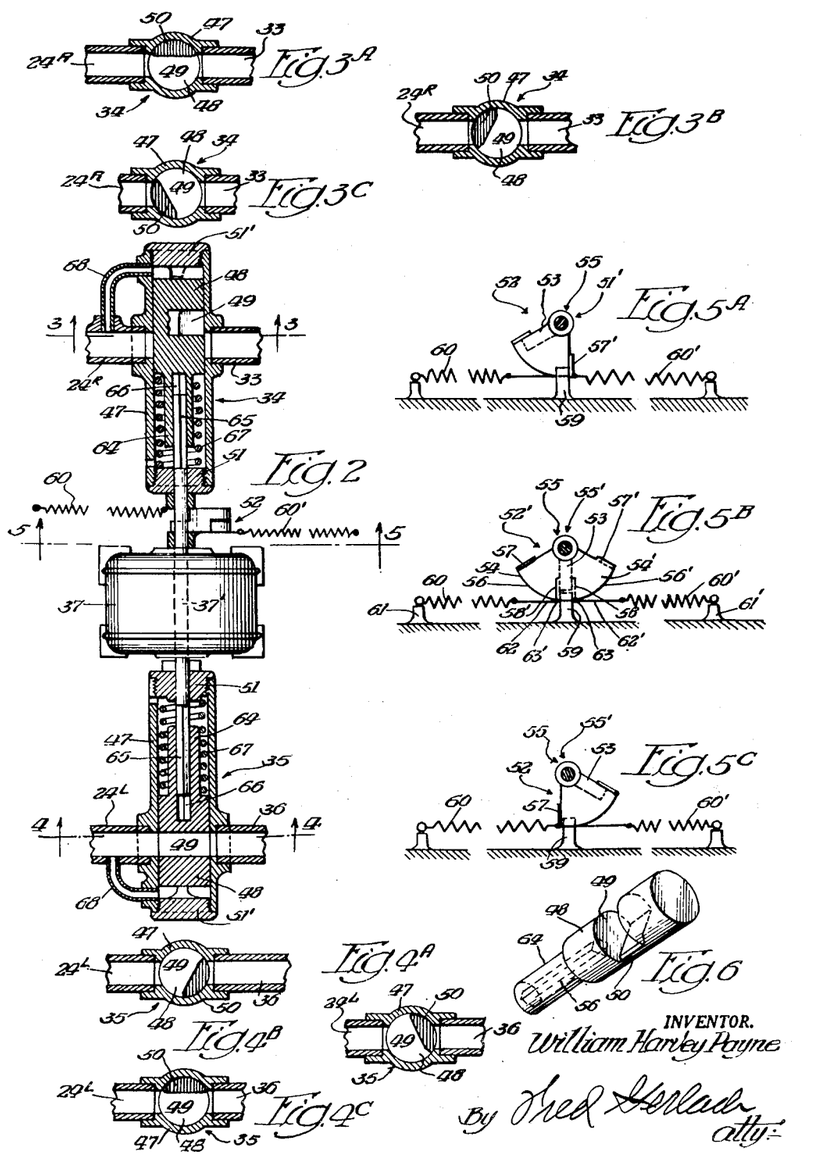
Fig. 2 is a sectional view taken substantially along the line 2—2 in Fig. 1.
Figs. 3A, 3B and 3C are sectional views taken substantially along the line 3—3 in Fig. 2 illustrating relatively shifted positions of the parts shown.
Figs. 4A, 4B and 4C are sectional views taken substantially along the line 4—4 in Fig. 2 illustrating relatively shifted positions of the parts shown.
Figs. 5A, 5B and 5C are sectional views taken substantially along the line 5—5 in Fig. 2 illustrating relatively shifted positions of the parts shown.
Fig. 6 is a perspective view of a part of the apparatus.

As shown more particularly in Fig. 2 of the drawings, the valves 34 and 35 each comprise a casing or shell 47 having a cylindrical bore within which is mounted a movable valve element 48, the shell 47 being formed with embossments defining openings or ports for the connection of the fluid conduits 24R, 33, 24L, and 36 therein opposite the valve elements 48.

The valve member 48 may comprise a cylindrical block having a transverse duct or channel 49 formed therein, at least one side of the duct being defined by a lateral portion 50 of the member 48. By angularly turning the member 48 in the housing 47 the valve structure may be adjusted either to block fluid flow through the structure or to allow flow at any adjusted rate up to the maximum capacity of the structure when in fully open position.

The valve member, however, is also axially shiftable in the casing 47 whereby the duct 49 may be disposed in alignment between the fluid flow ports of the casing 47 or may be moved to any desired extent out of alignment therewith. Accordingly fluid flow allowed by angular adjustment of the member 48 in the casing 47 may be modified by axial adjustment of the member 48 therein.

The valve means thus is adjustable in a plurality of directions for the control of fluid flow therethrough. As a consequence, fluid flow and the corresponding movement of the structure to be adjusted may be controlled in response to a plurality of separate variable conditions. In its broader aspects, of course, the present invention is not necessarily limited to the specific means shown for the accomplishment of the adjusting function in response to a plurality of variable controlling conditions, but contemplates any suitable means for applying a plurality of variables for the precision control of adjustable equipment. Nevertheless, the application of control valves of the sort herein shown, in an hydraulic adjusting system, comprises a valuable specific aspect of the present invention.

As shown, the opposite ends of the shells 47 are closed by end closure caps 51 and 51', and means is provided to drivingly connect the motor 37 with the valve members 48 to angularly turn the same in response to the displacement of the structure to be adjusted from a required position of adjustment. In this connection, centering means 52 may be provided for normally urging the motor 37 toward a neutral or centered position. Such means may comprise an arm 53 on the motor shaft 37', and a pair of centering plates 54, 54' journalled on the shaft as at 55, 55'. These plates have edges 56, 56' curved about the axis of the shaft 37' as a center, and limit flanges 57, 57', 58, 58' in position to be engaged by the arm 53 and also to engage a cooperating stop finger 59, mounted on or fast with respect to the frame of the motor 37. The centering means also includes a pair of opposing springs 60, 60', each respectively mounted, at one end on anchor posts 61, 61', fixed with respect to the frame of the motor, said springs at their opposite ends being secured to strings or cords 62, 62', which are secured respectively at 63, 63' to the plates 54, 54' at the ends of the curved edges thereof. The strings 62, 62' are adapted to engage in grooves formed in the edges 56, 56'. Accordingly, the centering means will assume the neutral or centered position shown in Fig. 5B when the motor is unloaded, that is to say, when the output voltages of the rectifiers 43 and 44 are equal, when the adjustable structure 16, 17 is in properly adjusted position. In such position the springs 60, 60' yieldingly urge and hold the plates 54, 54' in position, respectively with the stop lugs 58, 58' thereof in engagement with the stop finger 59, the shaft connected arm 53 being held in centered position by and between the lugs 58 and 58'.

As soon as the output voltage of one of the rectifiers exceeds that of the other, a condition which occurs when adjustment of the structure 16, 17 is required, the motor 37 will turn in the appropriate direction against the influence of one or other of the springs 60, 60'. If such motor movement is clockwise, the arm 53 will move the member 54' against the influence of the spring 60', toward the limit position shown in Fig. 5A in which the stop flange 57' of the member 54' engages the finger 59. The member 54 remains static, in neutral position, during displacement of the motor in clockwise direction from neutral position. If, on the other hand, motor movement be counterclockwise, the member 54 will be moved from neutral position toward the limit position shown in Fig. 5C, in which the stop flange 57 of the member 54 engages the finger 59. The member 54' of course, remains static in neutral position during counterclockwise displacement of the motor from neutral position. It will thus be seen that the motor works in one direction or the other against the springs 60, 60', which may be adjustably anchored on the posts 61, 61' to allow adjustment of the operating tension of the springs. As a consequence, motor displacement from neutral position, within the deceleration range, during arcing, is always proportional to the distance of movement necessary to bring the structure 16, 17 to a required position of adjustment. This results in bringing the structure 16, 17 to a smooth stop in adjusted position, at the desired rate of deceleration. The springs 60, 60' and motor 37 of course should be powerful enough to instantly overcome frictional and other factors resisting turning movement of the valve members 48, so that the valves may be instantly movable by the motor and springs.

The valve members 48 are so drivingly connected to the motor shaft 37' as to turn in the casings 47 in unison with the shaft. The flow channels 49 also are so oriented and arranged that the raising valve 34 is angularly in fully open position, as shown in Fig. 3A, when the lowering valve is angularly in fully closed position, as shown in Fig. 4B, such positions being assumed when the motor is at its movement limit in one direction from neutral position, as in Fig. 5A. When in neutral position of the motor, as shown in Fig. 5B, both raising and lowering valves 34 and 35 are closed, as shown in Figs. 3B and 4A; and said raising and lowering valves 34 and 35 respectively are angularly in fully closed and fully open positions as shown in Figs. 3C and 4C when the motor is at its movement limit in the other direction from neutral position, as in Fig. 5C. In order to obtain the desired alternate opening and closure of the valves 34 and 35, the motor 37 is required, in the illustrated embodiment, to rock in either direction from neutral position through an angle of sixty degrees. The valves also may be formed to open and close as the motor moves from and returns to neutral position, or they can be made to open shortly after the motor moves from, and to close shortly before the motor returns to, neutral position, in order thus to anticipate the approach toward neutral or adjusted position and thus minimize the danger of over-travel and resulting tendency to "hunt."

In order to connect the motor with the valve members 48, the caps 51 may be formed with openings through which the torque motor shaft 37' may extend into the valve casings 47. To this end the valves may be disposed in coaxial alignment with and at opposite ends of the motor, and the valve members 48 may be formed each with a sleeve 64 at one end and formed to receive and to make splined sliding engagement with the shaft 37', said shaft preferably having portions 65 of square or other non-circular sectional configuration adapted to fit in correspondingly shaped pockets 66 formed in the sleeve portions 64 of the valve members 48. The valve members thus may move axially in the casings 47, and the present invention contemplates means for controlling the axial position of the valve members in accordance with control conditions other than the conditions applied to control the angular adjustment of the valve members 48 whereby, in the interests of improved control precision, to modify, by axial valve adjustment, the control accomplished by angular adjustment.

To this end the members 48 may be resiliently biased in one axial direction, in the housings 47, as by means of springs 67 and the required axial adjustment may be accomplished by moving the members 48 against the springs 67 in proportion to the intensity of the modifying control conditions to be made effective in the adjustment of the structure 16, 17. In the illustrated embodiment these modifying conditions comprise varying speed, inertia, weight, friction and like variables encountered during the operation of the adjusting equipment. These variables are measurable in terms of fluid pressure in the conduit 24. Accordingly the fluid medium, at the variable pressure prevailing in the conduit 24, is applied to the members 48 in the valve casings 47, in fashion to adjustably move the members axially in the casings against the influence of the springs in proportion at all times to the pressure prevailing in the conduit 24. This may be accomplished, as shown in Figs. 1 and 2, by employing helical springs 67 in compression between the members 48 and the end covers 51, to normally urge the members 48 toward the covers 51' at the motor remote ends of the casings 47, and by providing fluid ducts 68, connected with the conduit system 24, and with the casings 47 immediately inwardly of the covers 51'. Fluid at the pressure prevailing in the conduit system 24 is thus at all times applied in each valve casing and made effective on the end of the member 48 in opposition to the contrary urge of the biasing spring 67.

The springs 67 are carefully selected to support the valve member 48 of the raising valve 34 with its channel 49 in full alignment with the fluid ports of the valves, when the opposing fluid pressure in the system 24 is a maximum, and to project the member 48 of the valve 34 toward the offset position shown in Fig. 2 as the operating pressure drops to a minimum. The member 48 of the lowering valve is arranged to be respectively in valve open and closed positions when the pressure is at minimum and maximum values. The valves are preferably arranged so that they cannot reach an axially offset or closed position completely blocking communication of the duct 49 with the valve ports. Normally the valves will be provided with springs 67 having characteristics matched to the operating fluid pressures of the installation in which the equipment is to be used, however, it is within the contemplation of the invention to provide means for adjusting the springs, in situ, as assembled in the valves, in order to accommodate the valves to specific operating pressures.

It will be apparent that the valves 34 and 35 may be combined in a single unit comprising a housing provided with pairs of ports for connection with the branches 24R and 24L of the flow system. Such housing may contain a single movable valve member having a flow channel for each of said pair of ports, and spring biased for axial displacement by fluid pressure fluctuations in the system. Such valve member may be angularly driven by the motor 37 and centering springs 60, 60', as heretofore described.

From the foregoing it will be seen that, as speed, weight, inertia, friction and other operational variables fluctuate, resulting fluid pressure changes in the conduit system 24 will axially shift the valve members 48 and thus increase or reduce the fluid flow path through the valves 34 and 35 in accordance with the increase or reduction in fluid pressure. Such increase and reduction of the fluid flow path will take place regardless of the degree of valve porting determined by the angular adjustment of the members 48 under control of the motor 37. As a consequence the apparatus is instantly responsive not only to displacement of the structure 16, 17 from a desired position of adjustment, by action of the motor, but is also instantly responsive to changes in the weight, inertia, speed, friction, and like operational variables, encountered during the adjusting action of the system, so as to compensate automatically for such changes in order to facilitate the adjusting operation and to minimize "hunting."

In this connection it will be observed that maximum raising speed or speed of projection of the structure will be obtained when the motor 37 is in the Fig. 5A position, the raising valve 34 being fully open as shown in Fig. 3A, and the valve 35 being closed as shown in Fig. 4B. Such maximum speed is attained under heavy load, imposed by maximum inertia, weight, friction, speed, and like operational conditions, with the valve member 48 in axial position presenting the duct 49 in full alignment with the valve ports thus allowing maximum fluid flow from the pump 27 to the cylinder. Maximum raising speed under lightest load is attained with the valve member 48 angularly in fully open position but axially adjusted to maximum displacement of the duct 49 with respect to the valve ports.

Substantially the same action or automatically self-adjusting control effect is accomplished in lowering or retracting the structure 16, 17 toward a desired position of adjustment. During lowering operations, however, maximum lowering speed is obtained with the valve 34 angularly in closed position as shown in Fig. 3C, the valve 35 being angularly wide open as shown in Fig. 4C and the motor being in the Fig. 5C position. Maximum lowering speed under heavy load is obtained with the valve member 48 axially in a position of maximum offset displacement with respect to the valve ports. Maximum lowering speed under light load is attained with the duct 49 in exact alignment with the valve ports.

Maximum speed in either direction, of course, is desired when the structure 16, 17 is substantially displaced from the required position of adjustment. As the structure approaches the position toward which it is being adjusted, the adjusting speed is progressively reduced, by action of the motor 37, in angularly adjusting the valve member 48 toward closed position; and any variations in the desired smooth, progressively reducing speed pattern are instantly corrected by suitable axial adjustment of the valve member 48.

Slowest raising speed, with light load is of course attained with minimum fluid flow through the valve 34, that is to say with the valve member 48 adjusted angularly to barely cracked position, and axially to the maximum offset position under the influence of the spring 67. With heavier loads, the valve member automatically shifts axially against the spring 67 to increase the fluid flow path through the valve in proportion with the extent of the load.

Slowest lowering speed with heaviest load, likewise is attained with minimum fluid flow through the valve 35, that is to say with the valve member 48 adjusted angularly to barely cracked position, and axially to the maximum offset position against the influence of the spring 67. With lighter loads, the valve member automatically shifts axially under the influence of the spring 67 to increase the fluid flow path through the valve proportionally as the load becomes lighter.

The equipment thus is automatically self-adjusting to meet varying conditions within the following limits:

(a) Fastest lift, with heaviest load, is accomplished with valve 34 adjusted axially and angularly to maximum flow positions.
(b) Slowest lift, with lightest load, is accomplished with valve 34 adjusted axially and angularly to minimum flow positions.
(c) Slowest drop, with heaviest load, is accomplished with valve 35 adjusted axially and angularly to minimum flow positions.
(d) Fastest drop, with lightest load, is accomplished with valve 35 adjusted axially and angularly to maximum flow positions.

Figure 7:
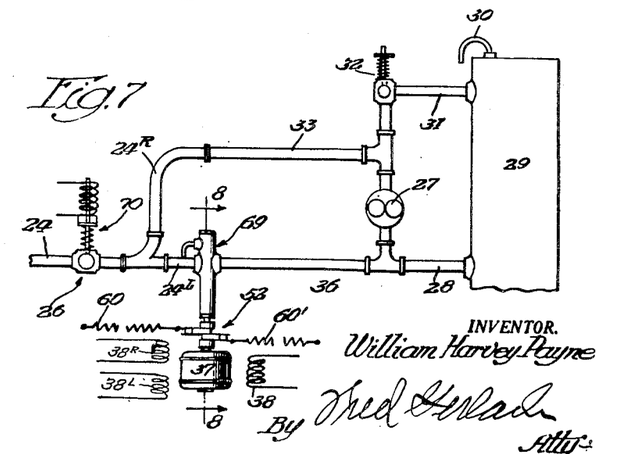
Fig. 7 is a schematic view of a modified form of adjusting equipment embodying the present invention.

A modified adjusting system embodying the invention is shown in Fig. 7. This is a "bleeder" system wherein a single control valve 69, similar to the valves 34 and 35, is connected between the conduit 24 and the return pipe 36, the pressure pipe 33 being connected directly to the conduit 24. In the system shown in Fig. 7, the structure 16, 17 is projected or raised by closing the vlave 69 to thus apply fluid under pressure through the pipe 33 and conduit 24 to the cylinder 22. The structure 16, 17 is lowered by opening the valve 69 to thus drain or "bleed" fluid from the conduit 24 and pipe 33 faster than it can be supplied through the pipe 33 at the pressure determined by the valve 32.

Figures 8, 9A, 9B, 9C:
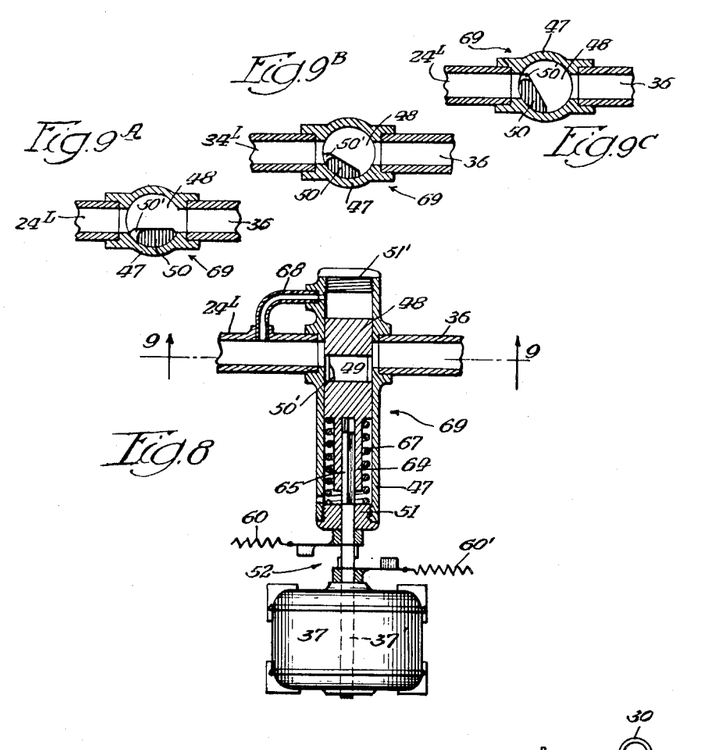
Fig. 8 is a sectional view taken substantially along the line 8—8 in Fig. 7.
Figs. 9A, 9B and 9C are sectional views taken substantially along the line 9—9 in Fig. 8 illustrating relatively shifted positions of the parts shown.

In the Fig. 7 arrangement, the motor 37 need only move in either direction from neutral position through a displacement of 22½ degrees, in order to move the valve member 48 angularly from the fully open or lowering position shown in Fig. 9A, through the neutral position shown in Fig. 9B, to the closed or lifting position shown in Fig. 9C. It will be noted also that when the motor is in neutral position, the valve member 48 is in an angular partially open position which represents the position in which the valve will bleed off exactly the entire flow of fluid delivered by the pump through the pipe 33. If the load should become lighter it would become necessary to bleed off more fluid to maintain the structure 16, 17 in stationary condition, and vice versa. This is automatically accomplished by arranging the duct 68 to move the member 48 axially in a direction to restrict the fluid flow path through the valve, in response to increased pressure in the conduit 24, and vice versa. Accordingly, the valve automatically adjusts for changes in load conditions for the lowering and static positions shown in Figs. 9A and 9B. In order to allow for automatic adjustment in the raising position it is necessary to relieve the closing edge of the valve portion 50 as indicated at 50', so that maximum raising speed will be attained with the valve completely closed by assumption of the angular position shown in Fig. 9C and maximum depression of the member by fluid pressure against the spring 67. With lighter loads the spring 67 will raise or move the member 48 sufficiently to open the valve by aligning the cutaway portion 50' with the valve ports to permit bleeding during the raising of lighter loads at maximum speed.

The present invention also provides for disabling the equipment in the event that the adjustable structure meets with an obstruction during adjusting movement within the adjusting range of the equipment or at the limits of such range. In an electric arc melting furnace "bottoming" occurs whenever the electrode engages with the charge to be melted. Any of the several furnace electrodes may thus "bottom" independently of the others. When such "bottoming" occurs, the electrode remote end of the arm 17 may drop, and the arm 17 thus tilt as the result of loose fit of the member 16 between the rollers 15. The "bottoming" of the electrode may, of course, strain or break the electrode due to the application thereon of the weight of the structure 16, 17, and to obviate the difficulty the switch 45 may be employed. This switch may comprise a normally closed device adapted to be open whenever the structure 17 is tilted as the result of "bottoming" of the electrode. The opening of the switch 45 disables the rectifier 44. Consequently, the rectifier 43 immediately becomes effective to actuate the motor 37 in a direction to raise the electrode support structure, thereby retracting the electrode from "bottoming" position. A similar switch may, of course, be used in connection with the motor 37 in the embodiment illustrated in Fig. 7. Alternately, a valve 70 may be incorporated in the conduit 24 of either of the systems shown in Figs. 1 and 7, said valve being normally spring biased toward closed position and provided with solenoid actuating means for opening the valve when and so long as the actuating solenoid is electrically energized. The solenoid of such a valve may be interconnected with a switch like the switch 45 and a suitable source of actuating power. When the "bottoming" switch is opened, the operating solenoid of the valve, of course, will become de-energized, thereby allowing the valve to close and prevent fluid flow in the conduit 24, thereby preventing further movement of the structure in the downward direction.

If desired, normally closed disabling switches may be employed in position to be opened by the adjustable structure 16, 17 when the same reaches the maximum limits of adjusting movement in either direction. These switches, respectively, may be inserted in the power supply circuits to the rectifiers 43, 44 in order thus to reverse adjusting movement of the structure 16, 17 when it reaches a limit of movement in either direction.

In the embodiment illustrated in Fig. 1, however, the limit of upward movement may be determined by applying a stop arm or finger 71 on the movable structure in position to engage a mechanical stop when the structure reaches the upper limit of its movement. Similar cooperating stops may be employed for engagement when the structure reaches its lower limit of movement. In either case, since the driving system is hydraulic, the parts may remain stationary at such movement limits, the valve 32 allowing the pump 27 to by-pass all of the fluid medium delivered through the pump directly back to the storage tank 29.

The present system, of course, may be controlled by hand if desired by providing manually operable arm on the shaft of the motor 37, whereby said shaft, regardless of the action of the system 39, may be moved in one direction or the other from neutral position in order to raise or lower the structure 16, 17. During such hand controlled adjustment the automatic adjustment accomplished by axial movement of the valve members 48 will, of course, be effective exactly as when the valves are actuated under control of the motor 37.

An important advantage deriving from the present invention is the ability to stop the structure 16, 17 in adjusted position, and to reverse the motion of the structure, substantially instantaneously and without overtravel. This facility is accomplished, in part by the use of motive means 37 and of valves 34, 35 having substantially no inertia and hence instantly responsive to varying control requirements. In this connection, the simple "bottoming" control afforded by the switch 45 is feasible only because the action of the system is substantially instantaneously responsive. Another factor contributing to operating precision is the provision of instantly acting means for effecting adjusting movement of the structure 16, 17, in response to changes in inertia, friction and other operational variables.

It will be understood, of course, that the invention is not necessarily limited to angular valve movement in response to power conditions in the supply conductor 19, and axial valve movement in response to pressure conditions in the conduit 24 but, by suitably modifying the equipment, the valves may be made to operate angularly under the control of pressure in the conduit and axially in response to power conditions in the conductor 19. The invention, furthermore, is not necessarily limited to hydraulic systems for the principle of modifying the action of an adjusting system in accordance with variations in adjusting speed, inertia, friction, and like operational variables may be applied to advantage in other power translation systems, although the hydraulic systems illustrated are particularly well adapted and susceptible to control in accordance with the teachings of the present invention.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the form herein disclosed being a preferred embodiment for the purpose of illustrating the invention.

The invention is hereby claimed as follows:

1. In adjusting means for the precise positioning of a movable structure comprising a fluid flow power translation system drivingly connected with said structure, a control valve comprising a casing having a cylindrical cavity and opposed ports connected in said system, a cylindrical valve member in said casing having a valve duct in position to interconnect said ports, said member being movable in an axial direction and separately turnable in an angular direction in said casing to control the size of the opening of said ports, means for adjusting the member in one of said directions to control fluid flow in said system for the positioning of the movable structure, and means to apply fluid under pressure to adjustably move said valve member in the other of said directions in accordance with pressure fluctuations in said system.

2. In adjusting means for the precise positioning of a movable structure comprising a fluid flow power translation system drivingly connected with said structure, a control valve comprising a casing having a cylindrical cavity and opposed ports connected in said system, a cylindrical valve member in said casing having a valve duct in position to interconnect said ports, said member being movable in an axial direction and separately turnable in an angular direction in said casing to control the size of the opening of said ports, means for adjusting the member in one of said directions to control fluid flow in said system for the positioning of the movable structure, means to apply fluid under pressure to adjustably move said valve member in the other of said directions in accordance with pressure fluctuations in said system, and spring means normally biasing said member in at least one of said directions toward a predetermined relative position in said casing.

3. In adjusting means for the precise positioning of a movable structure comprising a fluid flow power translation system including a cylinder and fluid actuated piston drivingly connected with said structure, a fluid delivery source and fluid conduit means interconnecting said source with said cylinder and including fluid delivery and return conduits, a fluid metering control valve comprising a casing having a cylindrical cavity and opposed ports connected in at least one of said conduits, a cylindrical valve member in said casing having a valve duct in position to interconnect said ports, said member being movable in an axial direction and separately turnable in an angular direction in said casing to control the size of the opening of said ports, means for adjusting the member in one of said directions to control fluid flow in said system for the positioning of the movable structure, and means to apply fluid under pressure to adjustably move said valve member in the other of said directions in accordance with pressure fluctuations in said system.

4. In adjusting means for the precise positioning of a movable structure comprising a fluid flow power translation system including a cylinder and fluid actuated piston drivingly connected with said structure, a fluid delivery source and fluid conduit means interconnecting said source with said cylinder and including fluid delivery and return conduits, a fluid metering control valve comprising a casing having a cylindrical cavity and opposed ports connected in said delivery conduit, a cylindrical valve member in said casing having a valve duct in position to interconnect said ports, said member being movable in an axial direction and separately turnable in an angular direction in said casing to control the size of the opening of said ports, means for adjusting the member in one of said directions, to control fluid flow in said system for the positioning of the movable structure, and means to apply fluid under pressure to adjustably move said valve member in the other of said directions in accordance with pressure fluctuations in said system.

5. In adjusting means for the precise positioning of a movable structure comprising a fluid flow power translation system including a cylinder and fluid actuated piston drivingly connected with said structure, a fluid delivery source and fluid conduit means interconnecting said source with said cylinder and including fluid delivery and return conduits, a fluid metering control valve comprising a casing having a cylindrical cavity and opposed ports connected in said return conduit, a cylindrical valve member in said casing having a valve duct in position to interconnect said ports, said member being movable in an axial direction and separately turnable in an angular direction in said casing to control the size of the opening of said ports, means for adjusting the member in one of said directions to control fluid flow in said system for the positioning of the movable structure, and means to apply fluid under pressure to adjustably move said valve member in the other of said directions in accordance with pressure fluctuations in said system.

6. In adjusting means for the precise positioning of a movable structure comprising a fluid flow power translation system including a cylinder and fluid actuated piston drivingly connected with said structure, a fluid delivery source and fluid conduit means interconnecting said source with said cylinder and including fluid delivery and return conduits, a fluid metering control valve in each of said conduits, each of said valves comprising a casing having a cylindrical cavity and opposed ports connected in said conduit, a cylindrical valve member in said casing having a valve duct in position to interconnect said ports, said member being movable in an axial direction and separately turnable in an angular direction in said casing to control the size of the opening of said ports, means for adjusting the member in one of said directions to control fluid flow in said system for the positioning of the movable structure, and means to apply fluid under pressure to adjustatbly move said valve member in the other of said directions in accordance with pressure fluctuations in said system.

7. In adjusting means for the precise positioning of a movable structure comprising a fluid pressure power translation system for moving the structure in either direction toward a desired position of adjustment, said system including a source of fluid under pressure, a fluid delivery conduit and a fluid return conduit, the combination with said translation system of valve means disposed in said delivery conduit and in said return conduit to control fluid flow therein, said valve means comprising a member movable in an axial direction and also in a direction angularly about its axis for controlling structure moving fluid flow in said system, spring means normally exerting spring tension to resist angular movement of said valve member, axial spring means normally exerting spring tension to resist axial movement of said valve member, means for adjustably shifting said member against spring tension in one of said directions, in accordance with the displacement of said structure from a required position of adjustment, and means to adjust the valve member in the other of said directions against spring tension in accordance with pressure fluctuations in said system.

8. In adjusting means for the precise positioning of an electrode in an electric furnace comprising a movable electrode support structure, a fluid pressure power translation system for moving the structure toward a desired position of adjustment, a control valve comprising a casing having a cylindrical cavity and opposed ports connected in said system, a cylindrical valve member in said casing having a valve duct in position to interconnect said ports, said member being movable in an axial direction and separately turnable in an angular direction in said casing to control the size of the opening of said ports, means for adjusting the member in one of said directions to control fluid flow in said system for the positioning of the movable structure, means to apply fluid under pressure to adjustably move said valve member in the other of said directions in accordance with pressure fluctuations in said system, and spring means normally biasing said member in at least one of said directions toward a predetermined relative position in said casing.

9. In adjusting means for the precise positioning of an electrode in an electric furnace comprising a movable electrode support structure, a fluid pressure power translation system for moving the structure toward a desired position of adjustment including a cylinder and fluid actuated piston drivingly connected with said structure, a fluid delivery source and fluid conduit means interconnecting said source with said cylinder and including fluid delivery and return conduits, a fluid metering control valve comprising a casing having a cylindrical cavity and opposed ports connected in at least one of said conduits, a cylindrical valve member in said casing having a valve duct in position to interconnect said ports, said member being movable in an axial direction and separately turnable in an angular direction in said casing to control the size of the opening of said ports, means for adjusting the member in one of said directions to control fluid flow in said system for the positioning of the movable structure, and means to apply fluid under pressure to adjustably move said valve member in the other of said directions in accordance with pressure fluctuations in said system.

10. In adjusting means for the precise positioning of an electrode in an electric furnace comprising a movable electrode support structure, a fluid pressure power translation system for moving the structure toward a desired position of adjustment, a control valve comprising a casing having a cylindrical cavity and opposed ports connected in said system, a cylindrical valve member in said casing and having a valve duct in position to interconnect said ports, said member being movable in an axial direction and separately turnable in an angular direction in said casing to control the size of the opening of said ports, means for adjusting the member in said angular direction to control fluid flow in said system for the positioning of said movable structure, spring means biasing said member axially in one direction in said casing, and means to apply fluid under pressure in said casing and upon said member to adjustably move the same axially against the influence of said spring means, whereby to adjust the size of said valve port opening in accordance with pressure fluctuations in said fluid pressure system.

11. In adjusting means for the precise positioning of an electrode in an electric furnace comprising a movable electrode support structure, a fluid pressure power translation system for moving the structure toward a desired position of adjustment, a control valve comprising a casing having a cylindrical cavity and opposed ports connected in said system, a cylindrical valve member in said casing and having a valve duct in position to interconnect said ports, said member being movable in an axial direction and separately turnable in an angular direction in said casing to control the size of the opening of said port, means for adjusting said member in one of said directions to control fluid flow in said system for the positioning of said movable structure, and means to apply fluid under pressure to adjustably move said valve member in the other of said directions, whereby to adjust the size of said valve port opening in accordance with pressure fluctuations in said system.

12. The method of adjusting a movable structure precisely which comprises applying motive power through a fluid pressure motive medium to the structure to move the same toward a desired position of adjustment at a desired rate of speed, adjusting the applied motive power to progressively reduce speed as the structure approaches said desired position, measuring in terms of fluid pressure fluctuations in the motive medium the operational variables, such as inertia and friction, which tend to alter the smooth adjusting movement at the desired decelerating speed, during the adjusting operation, and continuously applying said measured pressure fluctuations to correspondingly adjust the motive power, applied to the structure during the adjusting operation.

13. The method of adjusting a movable structure precisely, which comprises applying motive power through a fluid pressure motive medium to the structure to move the same toward a desired position of adjustment at desired speed, measuring in terms of fluid pressure fluctuations in the motive medium operational variables, such as inertia and friction, which tend to alter the accuracy of adjusting movement at desired speed, during the adjusting operation, and continuously applying said measured pressure fluctuations to correspondingly adjust the motive power, applied to the structure, during the adjusting operation.

14. The method of precisely adjusting an electrode in an electric arc furnace, which comprises applying to the electrode, through a fluid pressure motive medium, motive power proportional to the displacement of the electrode from a desired position of adjustment, whereby to shift the same toward such position of adjustment at desired speed, measuring in terms of fluid pressure fluctuations in the motive medium operational variables, such as inertia and friction, which tend to alter the accuracy of electrode adjusting movement at desired speed, during the adjusting operation, and continuously applying such measured pressure fluctuations to correspondingly vary the motive power applied to the structure during the adjusting operation.

15. In adjusting means for the precise positioning of a movable structure comprising a fluid flow power translation system drivingly connected with said structure, a control valve comprising a casing having a cylindrical cavity and opposed ports connected in said system, a cylindrical valve member in said casing having a valve duct in position to interconnect said ports, said member being movable in an axial direction and separately turnable in an angular direction in said casing to control the size of the opening of said ports, means for adjusting the member in one of said directions to control fluid flow in said system for the positioning of the movable structure, and means to apply fluid under pressure fluctuating in accordance with the pressure in said system to adjustably move said valve member in the other of said directions in accordance with pressure fluctuations in said system.

16. In adjusting means for the precise positioning of a movable structure comprising a fluid flow power translation system drivingly connected with said structure, a control valve comprising a casing having a cylindrical cavity and opposed ports connected in said system, a cylindrical valve member in said casing having a valve duct in position to interconnect said ports, said member being movable in an axial direction and separately turnable in an angular direction in said casing to control the size of the opening of said ports, means for adjusting the member in said angular direction to control fluid flow in said system for the positioning of the movable structure, spring means biasing said member axially in one direction in said casing, and means to apply fluid under pressure in said casing and upon said member to adjustably move same against said spring in accordance with pressure fluctuations in said system.

17. In adjusting means for the precise positioning of a movable structure comprising a fluid pressure power translation system for moving the structure in either direction toward a desired position of adjustment, said system including a source of fluid under pressure, a fluid delivery conduit and a fluid return conduit, the combination with said translation system of valve means disposed in said return conduit to control fluid flow therein, said valve means comprising a member movable in an axial direction and also in a direction angularly about its axis for controlling structure moving fluid flow in said system, spring means normally exerting spring tension to resist angular movement of said valve member, axial spring means normally exerting spring tension to resist axial movement of said valve member, means for adjustably shifting said member against spring tension in one of said directions, in accordance with the displacement of said structure from a required position of adjustment, and means to adjust the valve member in the other of said directions against spring tension in accordance with pressure fluctuations in said system.

WILLIAM HARVEY PAYNE.

References Cited in the file of this patent

UNITED STATES PATENTS

| Number | Name | Date |
|---|---|---|
| 1,502,548 | Carrick | July 22, 1924 |
| 1,528,510 | Ritz | Mar. 3, 1925 |
| 1,562,204 | Carlstedt | Nov. 17, 1925 |
| 1,877,969 | Richter | Sept. 20, 1932 |
| 2,160,490 | Strong | May 30, 1939 |
| 2,201,483 | Eklund | May 21, 1940 |
| 2,539,912 | Journeaux | Jan. 30, 1951 |